United States Patent
Weirauch

(10) Patent No.: US 7,636,440 B2
(45) Date of Patent: Dec. 22, 2009

(54) DIGITAL WATERMARK WITH VARIABLE LOCATION

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1398 days.

(21) Appl. No.: 10/355,422

(22) Filed: Jan. 31, 2003

(65) Prior Publication Data

US 2004/0151313 A1 Aug. 5, 2004

(51) Int. Cl.
  *H04N 7/167* (2006.01)
  *H04L 9/32* (2006.01)
  *H04N 1/32* (2006.01)
  *H04N 7/26* (2006.01)
(52) U.S. Cl. .................. 380/203; 380/100; 380/232; 713/176; 713/179
(58) Field of Classification Search .......... 380/203, 380/232; 382/250, 100; 713/176, 179
See application file for complete search history.

(56) References Cited

U.S. PATENT DOCUMENTS

2002/0099943 A1* 7/2002 Rodriguez et al. .......... 713/176
2002/0146123 A1* 10/2002 Tian ............................ 380/234
2003/0215110 A1* 11/2003 Rhoads et al. ............... 382/100
2004/0034778 A1    2/2004 Celik

FOREIGN PATENT DOCUMENTS

| EP | 0928110 | 7/1999 |
| EP | 0899688 | 1/2001 |
| EP | 1617643 A2 * | 1/2006 |
| JP | 2003-078515 | 3/2003 |

OTHER PUBLICATIONS

Hao-hua Chu, Lintian Qiao, Klara Nahrstedt, Hua Wang, Ritesh Jain, "A secure multicast protocol with copyright protection",Apr. 2002, SIGCOMM Computer Communication Review , vol. 32 Issue 2, Publisher: ACM, pp. 42-60.*
Foreign Search Report dated Jun. 15, 2004 for GB application No. GB040050838.

* cited by examiner

*Primary Examiner*—Matthew B Smithers
*Assistant Examiner*—Courtney D Fields

(57) ABSTRACT

A digital watermark in a data file occurs at multiple locations within the file. The location of each digital watermark, other than a first digital watermark, is specified by a previous digital watermark, or by other auxiliary information in a same logical block as a previous digital watermark.

16 Claims, 2 Drawing Sheets

DIGITAL WATERMARK WITH VARIABLE LOCATION

FIELD OF INVENTION

This invention relates generally to methods and apparatus for embedding auxiliary digital data within primary digital data, and more particularly to digital watermarking.

BACKGROUND

There is an ongoing need for embedding auxiliary digital data within primary digital data (sometimes referred to as content or user content). The auxiliary data may be used, for example, for identification of ownership, or origin, or usage control information. A digital watermark is auxiliary data, embedded in primary digital data, created by modifying the primary digital data. Since the original data is modified, digital watermarks are typically confined to human perceptible data such as audio, image, and video, and the data is typically modified in such a way that the digital watermark is "transparent" (not perceptible).

A digital watermark can serve as an indicator of usage control if present, but it is theoretically possible to remove a digital watermark from primary data that originally included a watermark, resulting in useable unprotected primary data. In addition, some common transformations of entertainment data, such as compression, scaling and clipping may alter or destroy a digital watermark. Alternatively, a system may require the presence of a valid watermark, and the system may refuse to read the primary data, or refuse to provide an output, if a valid watermark is not present. It is theoretically possible to add or modify a watermark to enable unauthorized use or copying.

There is a need for persistent digital watermarking that can deter intentional and unintentional destruction and removal, and that can deter casual addition or modification.

SUMMARY

A digital watermark in a data file occurs at multiple locations within the file. The location of each digital watermark, other than a first digital watermark, is specified by a previous digital watermark, or by other auxiliary information in a same logical block as a previous digital watermark.

DETAILED DESCRIPTION

FIG. 1 illustrates a data file logically divided into blocks. The data file may be on a medium (for example, magnetic disk, optical disk, or tape), or may be transmitted (transmitting includes wired or wireless transfer of the data). A first block 100 includes a digital watermark (depicted by a black dot). The watermark in the first block 100, or auxiliary data in block 100, specifies a beginning location, and a number of consecutive blocks, for the next digital watermark. Block 100 includes data that specifies that the next watermark is in block 102, and that three consecutive blocks starting at block 102 include a digital watermark. Block 102 (or one of the other blocks in the three consecutive blocks that include a digital watermark) includes data that specifies the next block (or set of consecutive blocks) that includes a digital watermark.

Figure 1A:
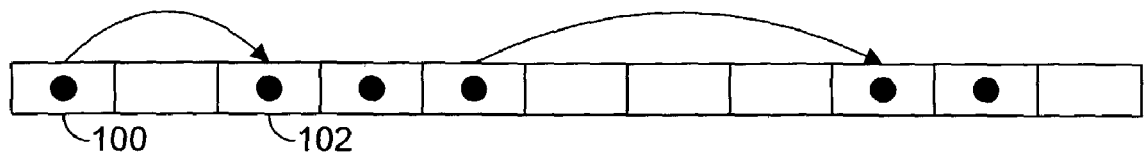
FIG. 1A is a block diagram of an example embodiment of a data file including digital watermarks, with a first example method for specifying digital watermark locations.
Figure 1B:
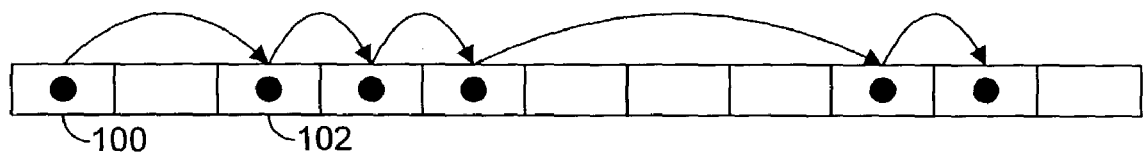
FIG. 1B is the block diagram of a data file of FIG. 1A, with a second example method for specifying digital watermark locations.

In FIG. 1B, blocks include digital watermarks as in FIG. 1A, with an alternative method for specifying a location for a next digital watermark. In FIG. 1B, data, in each block that includes a digital watermark, specifies the location of the next block that includes a digital watermark.

Figure 1C:
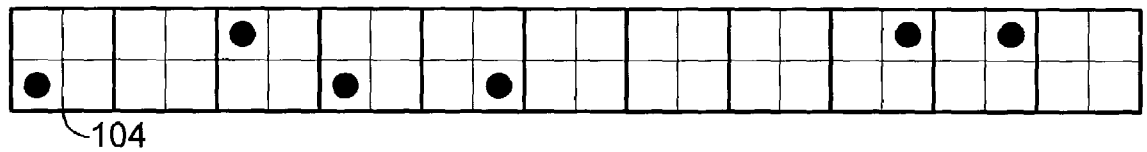
FIG. 1C is a block diagram of an example embodiment of a data file with each data block logically formatted into sub-blocks.

In FIG. 1C, blocks are further logically divided into sub-blocks. For example, block 104 is logically divided into four sub-blocks. Data within block 104 may specify the block location of the next digital watermark, and the sub-block location within a block.

Figure 1D:
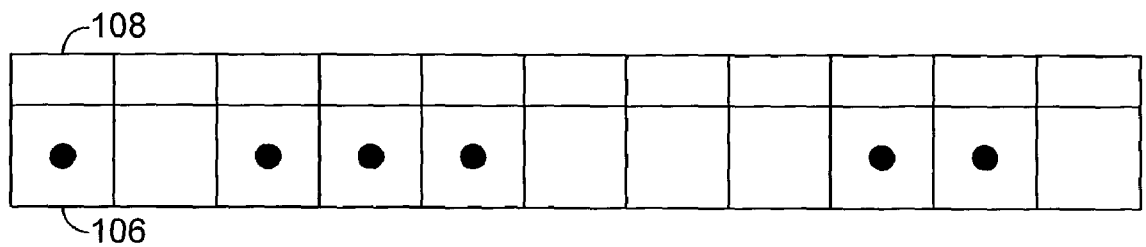
FIG. 1D is a block diagram of an example embodiment of a data file with each data block having a header.

In FIG. 1D, blocks 106 include a header 108. A header is auxiliary information, typically comprising such things as identification and usage control. Data within a header may specify the block location (and sub-block location if appropriate) of the next digital watermark.

Each digital watermark may include watermark data that specifies the location of the next digital watermark. Alternatively, the data that specifies the location of the next digital watermark may be included in auxiliary data within a logical block (for example, in a header as illustrated in FIG. 1D). As still another alternative, auxiliary data may be embedded in encoded user content, or within overhead data such as error detection data and error correction data. The user content is not modified as in a digital watermark. For example, see U.S. Pat. No. 5,699,434 (Hogan), and divisions of that patent (U.S. Pat. Nos. 5,828,754, and 6,278,386), hereby incorporated by reference. The data that specifies the location of the next digital watermark may be included in data embedded in encoded data or embedded in overhead data, in the block including the digital watermark, for example as taught in Hogan.

Specification of the location of the next digital watermark may comprise a block number. Alternatively, specification of location may comprise a time value (for example, music compact disks include time information). Alternatively, specification of location may comprise a video frame number and row-column coordinates for a picture element within a frame. Alternatively, specification of location may comprise a relative value (for example, skip 3 blocks; or for example, skip 3 frames and move a distance of 100 picture elements at an angle of 135 degrees).

A block may comprise a physical unit, for example a sector or track on a medium. Alternatively, a block may comprise a logical unit, such as an encoding block for error detection and correction, for example as discussed in Hogan. Alternatively, a block may comprise a digital video frame. Alternatively, a block may comprise a logical unit of compressed data. An uncompressed video frame is logically formatted into rows and columns of picture elements (pixels). Discrete cosine transformations, commonly used for compression of digital video, divide each video frame into blocks of pixels for compression, for example, 8 pixels by 8 pixels. A header is then added to each compressed block. Alternatively, a block may comprise a contiguous group of physical units or logical units, where a digital watermark may span the group. For example, for digital video, a digital watermark containing data may span multiple video frames, in which case a block as discussed in conjunction with FIGS. 1A-1D is the group of frames containing the digital watermark.

Digital watermarks sometimes involve modification of the least significant bits of data to make the digital watermark imperceptible. However, least significant bits are susceptible to further modification by scaling, clipping, compression, and intentional attack. If additional more-significant bits of data are modified to make a digital watermark more robust, then there is increased risk that the digital watermark may be objectionable to a human observer. In the following example, digital watermarking with variable position as discussed above enables robust digital watermarking without creating an objectionable artifact.

Figure 2:
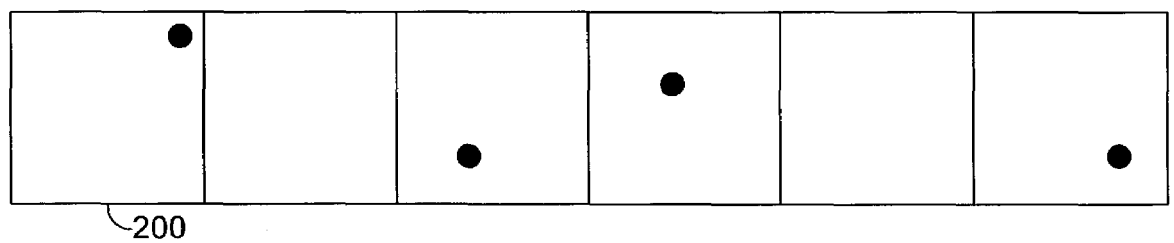
FIG. 2 is a block diagram of an example embodiment of video frames with digital watermarks that vary in location.

In FIG. 2, block 200 depicts a frame of uncompressed video data. A digital watermark in FIG. 2 may include at least one pixel for which the intensity is substantially modified (depicted by a black dot). Multiple bits may be modified, or the pixel(s) may even be completely replaced with a new value.

If one or more pixels are substantially modified for many consecutive video frames, they would be noticeable to a human observer. However, if one or a few substantially modified pixels occur for short periods of time, and relatively infrequently, and if the location within a video frame varies substantially, then the digital watermark may not be noticeable. For example, if the modified pixel occurs for a duration of only 1/30 of a second, and reoccurs only every few seconds, and if every recurrence is in a different location within a video frame, it may not be noticeable. Probability of perception may be reduced even further by intentionally placing the watermark in locations within video images so as to reduce contrast between the watermark and surrounding image. This placement can be performed automatically or manually.

A digital watermark including at least one substantially modified pixel in a block of video data may include data specifying the location of the next digital watermark. Alternatively, the location of the next digital watermark may be included in a header (for example, for a compression block), or in data embedded in encoded data or overhead data. As discussed above, digital watermark data may span multiple digital video frames.

Digital watermark data including at least one substantially modified pixel will not be removed or destroyed by manipulation of user content that may modify least significant bits, for example lossy compression. If data specifying the location of the next digital watermark is embedded as part of the digital watermark by modifying least-significant-bits, the location specification data may be impacted by manipulation of user content. However, if the data specifying the location of the next digital watermark is included in headers, or is embedded in encoded data or other overhead data, it is much less susceptible to destruction by manipulation of user content.

Some systems require the presence of a digital watermark. Generating a digital watermark that varies from block to block, with no particular pattern, will deter casual attempts to add a watermark.

What is claimed is:

1. A data medium, comprising:
   data, logically organized into blocks;
   a plurality of digital watermarks, within the data, where a location of each digital watermark other than a first digital watermark is specified within a block of data that includes a previous digital watermark,
   wherein said digital watermarks provide usage control for said data.

2. The data medium of claim 1, further comprising:
   a location of each digital watermark other than a first digital watermark is specified within a previous digital watermark.

3. The data medium of claim 1, further comprising:
   a location of each digital watermark other than a first digital watermark is specified within a header of a block of data that includes a previous digital watermark.

4. The data medium of claim 1, the data comprising first data, further comprising:
   a location of each digital watermark other than a first digital watermark is specified within auxiliary data embedded in a block of first data that includes a previous digital watermark, without modifying the first data.

5. The data medium of claim 1, further comprising:
   each block comprises a frame of video data; and
   each digital watermark comprises at least one pixel in the video data that is substantially modified to prevent least-significant-bit manipulation.

6. A data medium, comprising:
   data, logically formatted into blocks;
   a first digital watermark embedded in a first block of the data; and
   a next digital watermark embedded in a second block of the data, where a location of the next digital watermark within the data is specified in the first block,
   wherein said digital watermarks provide usage control for said data.

7. The data medium of claim 6, further comprising:
   data within the first block specifies a number of consecutive occurrences of additional digital watermarks.

8. The data medium of claim 6, further comprising:
   data within each block that includes a digital watermark specifies a location of a next digital watermark.

9. The data medium of claim 6, further comprising:
   data within each block that includes a digital watermark specifies a block, and location within a block, of a next digital watermark.

10. The data medium of claim 6, further comprising:
    the location of the second digital watermark being specified as a relative location.

11. The data medium of claim 6, further comprising:
    each block comprises a frame of video data;
    each digital watermark comprises at least one pixel in the video data that is substantially modified to prevent least-significant-bit manipulation.

12. A method, comprising:
    (a) embedding, by an apparatus, a first digital watermark in a first block of data;
    (b) inserting, by the apparatus, a location of a next digital watermark in the first block of data; and
    (c) modifying, by the apparatus, a second block of data at the location specific in step (b) to include the next digital watermark.

13. The method of claim 12, further comprising:
    recording the first and second blocks of data on a medium.

14. The method of claim 12, further comprising:
    transmitting the first and second blocks of data.

15. A method, comprising:
    modifying at least one first pixel in a first frame of video data;
    inserting, at least partially in the first frame of video data, a location of at least one second pixel in a second frame of video data; and then
    modifying, in the second frame of video data, the at least one second pixel.

16. An apparatus, comprising:
    means for embedding a first digital watermark in a first block of data;
    means for incorporating a location, of a next digital watermark, in the first block of data; and
    means for embedding the next digital watermark in a second block of data at the location.

* * * * *